Figure 1:
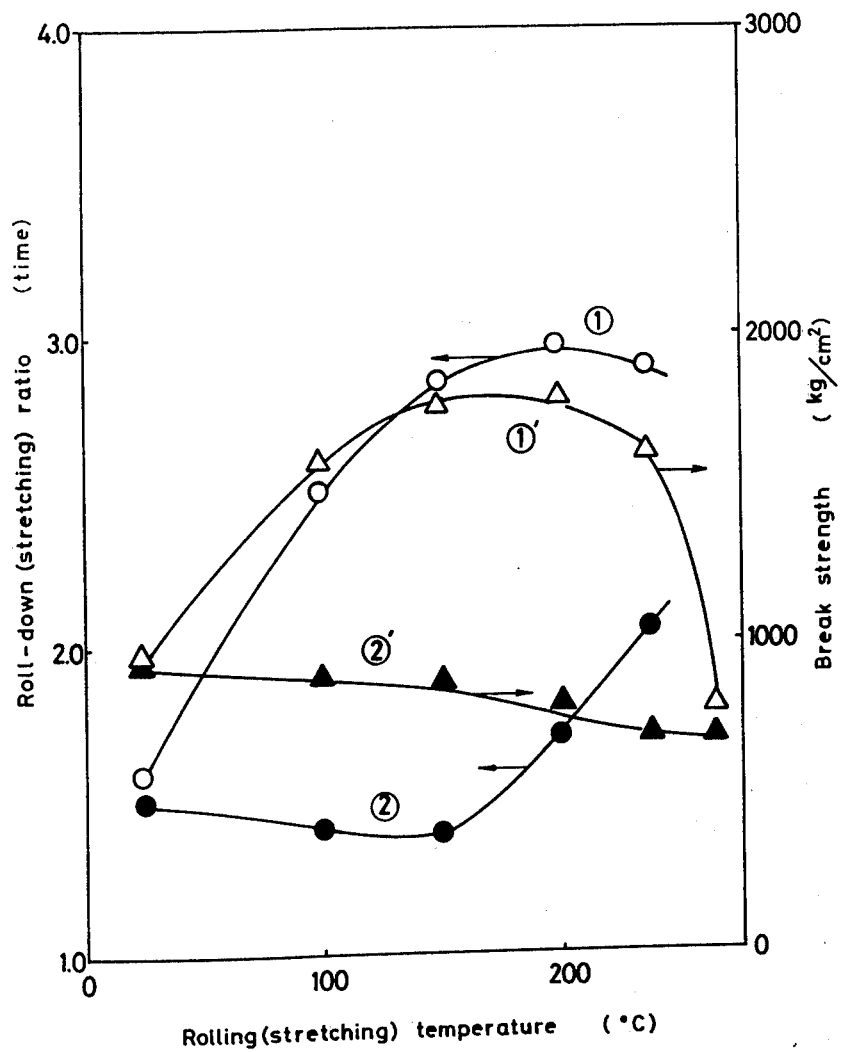

United States Patent [19]

Fukushima et al.

[11] 4,120,931
[45] Oct. 17, 1978

[54] METHOD OF MANUFACTURING ORIENTED AMORPHOUS AROMATIC POLYMERIC FILMS

[75] Inventors: Nobuo Fukushima, Otsu; Yukikazu Uemura, Amagasaki; Takuzo Okumura, Tokyo; Haruo Hayashida, Takatsuki, all of Japan

[73] Assignee: Sumitomo Chemical Company, Limited, Osaka, Japan

[21] Appl. No.: 801,020

[22] Filed: May 26, 1977

[30] Foreign Application Priority Data

| May 27, 1976 [JP] | Japan | 51-61896 |
| Sep. 22, 1976 [JP] | Japan | 51-114278 |
| Dec. 20, 1976 [JP] | Japan | 51-153921 |

[51] Int. Cl.² ............ B29D 7/24; B29C 17/02
[52] U.S. Cl. ............ 264/288; 264/175; 264/289
[58] Field of Search ........ 264/288, 289, 210 R, 264/175, 216, 290 R, 290 N, 290 T; 260/78 S

[56] References Cited

U.S. PATENT DOCUMENTS

| 3,340,235 | 9/1967 | Holt | 260/87 S |
| 3,504,075 | 3/1970 | Williams, Jr. et al. | 264/288 |
| 3,553,304 | 1/1971 | Reese et al. | 264/210 R |
| 3,600,361 | 8/1971 | Heacock et al. | 264/289 |
| 3,792,019 | 2/1974 | Gattus et al. | 264/288 |
| 3,939,116 | 2/1976 | Johnson et al. | 264/288 |
| 7,857,013 | 12/1968 | Jennings | 264/288 |

FOREIGN PATENT DOCUMENTS

| 2,323,907 | 11/1974 | Fed. Rep. of Germany | 264/210 R |
| 1,106,367 | 3/1968 | United Kingdom | 264/288 |

OTHER PUBLICATIONS

"Roll Clearer and Better Sheet–Faster", R. F. Williams, Jr., et al., SPE Journal, 12/71, vol. 27, pp. 42–48.

Primary Examiner—James B. Lowe
Attorney, Agent, or Firm—Wenderoth, Lind & Ponack

[57] ABSTRACT

A method for producing a high-strength film of amorphous aromatic high polymers comprising rolling said polymer between rolls, and stretching the rolled film of said polymer.

28 Claims, 1 Drawing Figure

METHOD OF MANUFACTURING ORIENTED AMORPHOUS AROMATIC POLYMERIC FILMS

The present invention relates to a method for producing a high-strength film of amorphous aromatic high polymers. More particularly, it relates to (1) a method for producing a high-strength film of amorphous aromatic high polymers which comprises passing a raw film comprising said high polymer, which contains more than 80% of an amorphous resin having aromatic nuclei in the main chains thereof, a crystallinity of less than 30% and a secondary transition point of higher than 150° C., through at least one pair of compression rolls kept between the temperatures 100° C. lower than and 50° C. higher than the secondary transition point of said amorphous resin, thereby rolling and orientating said raw film, and (2) a method for producing a high-strength film of amorphous aromatic high polymers which comprises passing a raw film comprising said high polymer, which contains more than 80% of an amorphous resin having aromatic nuclei in the main chains thereof, a crystallinity of less than 30% and a secondary transition point of higher than 150° C., through at least one pair of compression rolls kept between the temperatures 100° C. lower than and 50° C. higher than the secondary transition point of said amorphous resin, thereby rolling said raw film, and then stretching the rolled film in the same direction as and/or in the direction normal to that of rolling, at a temperature between the temperatures 50° C. lower than and 50° C. higher than the secondary transition point of said amorphous resin.

Many of the thermoplastic resins having aromatic nuclei in main chains thereof have a high resistance to heat because the chains are difficultly movable. Consequently, it may be expected that such resins are applicable to the fields requiring a high resistance to heat, for example insulating films for motors, transformers or condensers, flexible bases for printed circuits and films for movies. But, these fields require mechanical strength as well. For example, it is said that insulating film for motors should have a tensile strength of about 1500 kg/cm² on taping, and therefore unoriented film having as low a tensile strength as at most 700 to 800 kg/cm² is poor in mechanical strength and unsatisfactory in terms of practical value. These drawbacks are improved by orienting raw film or sheet by mechanical means.

The conventional well-known methods for orienting a film or sheet involve stretching, but it is regarded as difficult to obtain a high-strength film from a film or sheet of amorphous aromatic high polymers by stretching, because said polymers are very poor in suitability for stretching.

An object of the present invention is to provide an industrial method for producing a high-strength film of amorphous aromatic high polymers which comprises orienting the film or sheet of said polymer, thereby significantly improving its mechanical properties.

The inventors extensively studied this object, and found that the oriented film of amorphous aromatic high polymers can be obtained satisfactorily by passing a raw film comprising said high polymer, which contains more than 80% of an amorphous resin having aromatic nuclei in main chains thereof, a crystallinity of less than 30% and a secondary transition point of higher than 150° C., through at least one pair of compression rolls kept between the temperatures 100° C. lower than and 50° C. higher than the secondary transition point of said amorphous resin. Thus, the inventors attained the first method referred to above.

The high polymers of the present invention need to contain more than 80% of an amorphous resin having aromatic nuclei in main chains thereof, a crystallinity of less than 30% and a secondary transition point of higher than 150° C. In other words, when the content of said resin in the high polymers is less than 80%, the high resistance to heat of said resin can not be made use of.

Among amorphous resins having aromatic nuclei in main chains thereof and a crystallinity of less than 30%, those having a secondary transition point of lower than 150° C. can be applied to the usual stretching, like polycarbonate resins, and, as is well known from U.S. Pat. No. 3,504,075, they can be applied to rolling as well. And, among amorphous resins having aromatic nuclei in main chains thereof, those having a crystallinity of more than 30% are widely applied to the usual stretching, like polyethylene terephthalate resins, and, as is well known from U.S. Pat. No. 3,504,075, they can be applied to rolling as well.

It may be said that the effect of the present invention consists in the following point: The orientation of high polymers, which contain more than 80% of an amorphous resin having aromatic nuclei in main chains thereof, a crystallinity of less than 30% and a secondary transition point of higher than 150° C., was so far regarded as impossible, but it became possible by the method of the present invention.

Next, compounds which may be blended with said amorphous resin will be shown hereinafter. As resins, those having a relatively high resistance to heat (e.g. polyethylene terephthalate, polybutylene terephthalate, polycarbonate, ABS resins) are preferred because they do not significantly lower the resistance to heat of said amorphous resin. Further, inorganic fillers may be added depending upon the purposes of use. The fillers include calcium carbonate, silicates of fine powder, talc, basic magnesium carbonate, alumina, alumina hydrate, barium sulfate, calcium sulfate, mica powder, zinc oxide, titanium oxide, carbon black and the like.

Further, it is most preferred that the high polymers consist of said amorphous resin alone, because the high resistance to heat of said amorphous resin can be made use of to its utmost.

The temperature of the compression rolls in one or more pairs needs to be kept between the temperatures 100° C. lower than and 50° C. higher than the secondary transition point of the amorphous resin. When the temperature is lower than this range, it is necessary to increase the number of compression rolls and the power applied to the compression rolls in order to obtain a desired roll-down ratio. As a result, instrumental problems occur and expensive equipments are required, which is very undesirable as a rolling condition. While, when the temperature is higher than this range, said high polymers adhere to the compression rolls on rolling, and a good orientation effect can not be obtained. Consequently, the temperature of compression rolls in one or more pairs should be within the above-mentioned temperature range.

Further extensive study by the inventors lead to the second method referred to above. Referring to the second method in more detail, even the high polymers comprising an amorphous aromatic resin, which are difficult to form into a high-strength film because they are difficult to stretch by the usual stretching or, if stretched, result in low elongation percentage, can be rolled into film having a high degree of orientation in the machinery direction by passing the high polymer through one or more pairs of compression rolls kept between the temperatures 100° C. lower than and 50° C. higher than the secondary transition point of said amorphous resin. And, the oriented rolled film is at the same time endowed with an improved suitability for continuous stretching so that they can easily be stretched, without breaking the film, in the same direction as and/or in the direction normal to that of rolling between the temperatures 100° C. lower than and 50° C. higher than the secondary transition point of said amorphous resin.

In this way, it became possible to produce a high-strength film, continuously and extremely stably, from the high polymers comprising an amorphous aromatic resin which can not form such a film by the conventional stretching.

But the final elongation ratio by rolling and stretching in the same direction as and/or in the direction normal to that of rolling should not exceed 6. Specifically, both the total elongation ratio (by rolling plus stretching in the same direction as that of rolling) and the elongation ratio (by stretching in the direction normal to that of rolling, when the directions of stretching and rolling are different) should not exceed 6.

In the present invention, a raw film or sheet of the high polymers comprising an amorphous aromatic resin is produced by the extrusion process, calendering process or solvent casting process. In the rolling and stretching processes, the raw film or sheet may be preheated by means of infrared ray, far infrared ray, high-frequency, hot air, steam or hot liquid bath, but this pre-heating is not essential.

Among said high polymers, those having excellent heat resistance and electrical properties, for example polyarylene polyether polysulfone resins, polyarylate resins, polyimide resins, polyamideimide resins, polyphenylene oxide resins, polyhydantoin resins, polyoxadiazole resins, polyparabanic acid resins, polyoxaninedione resins and the like are particularly preferred. The term "polyarylene polyether polysulfone resins" referred to herein means polyarylene compounds in which arylene units are randomly or regularly arranged via an ether linkage and sulfone linkage. For example, there may be exemplified polyarylene compounds of the formulae 1 to 16, among which 1 and 6 are preferred.

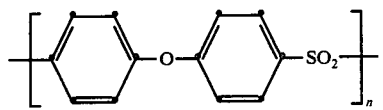

1

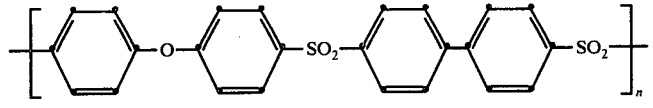

2

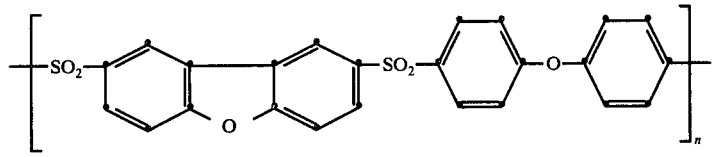

3

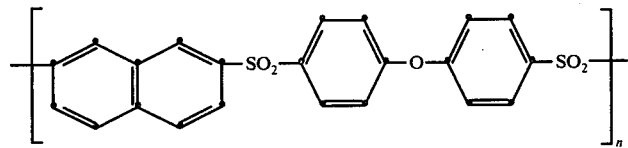

4

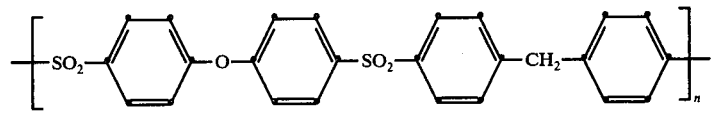

5

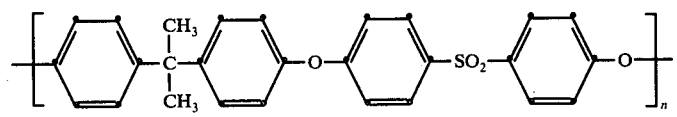

6

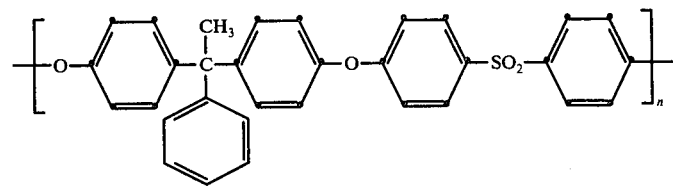

7

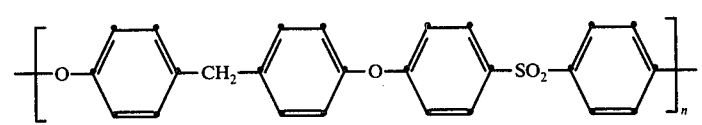

8

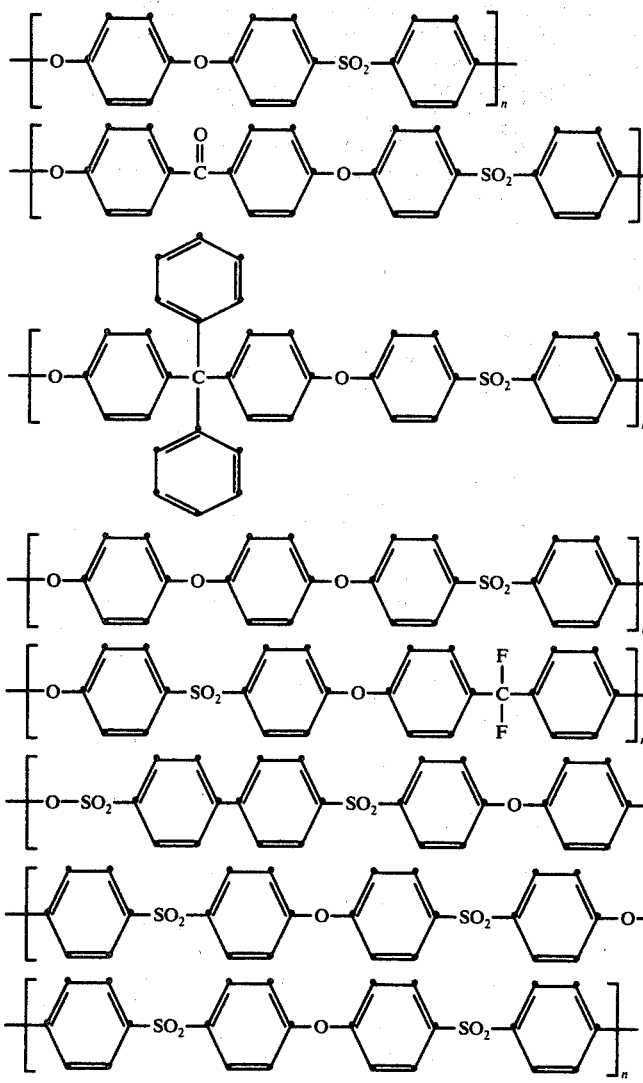

The term "polyarylate" means aromatic polyesters (referred to as "APC" hereinafter) resulting from dihydric phenols or functional derivatives thereof and aromatic dibasic acids or functional derivatives thereof, and aromatic polyesters (referred to as "APE" hereinafter) resulting from dihydric phenols or functional derivatives thereof, aromatic dibasic acids or functional derivatives thereof, and p-oxybenzoic acid or functional derivatives thereof.

Specifically, the dihydric phenols are those having the following formula,

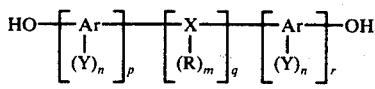

wherein Ar is an aromatic nucleus (e.g. phenylene, biphenylene or naphthylene group); R is a hydrogen atom, an alkyl (e.g. methyl, ethyl), halogenated alkyl, aryl (e.g. phenyl, naphthyl), halogenated aryl, aralkyl (e.g. benzyl, phenylethyl), halogenated aralkyl, alkyl-substituted aryl, halogenated alkyl-substituted aryl, alicyclic or halogenated alicyclic group; X is an alkylene or alkylidene group (e.g. methylene, ethylene, propylene, ethylidene, propylidene, isopropylidene), two or more alkylene or alkylidene groups connected via an aromatic, tert-amino (—N(alk)—), ether (—O—), carbonyl (—CO—), or sulfur-containing group (e.g. sulfide (—S—), sulfoxide (—SO—), sulfonyl (—SO$_2$—)), alicyclic group, ether group, carbonyl group, tert-amino group, or sulfur-containing group (e.g. sulfide, sulfoxide, sulfonyl); Y is a halogen atom, a nitro group or a group represented by R' or OR' wherein R' has the same meanings as R; $m$ is zero or an integer not more than the number of the replaceable hydrogen atoms connected to the group X; $n$ is zero or an integer not more than the number of the replaceable hydrogen atoms connected to the aromatic nucleus Ar; $p$ is an integer of at least 1; $q$ is zero or 1; and $r$ is an integer provided that $r$ may be zero when $q$ is zero.

In the foregoing dihydric phenols, when $n$ is two or more, Y may be the same or different. The same thing applies to R and R'. The position of the substituent (Y) connected to the aromatic nucleus (Ar) may be any of ortho, meta or para to the hydroxyl group (OH). The ortho-, meta- and para-isomers may be used alone or in combination.

The examples of the preferred diphenol of the foregoing formula are as follows: Bis(4-hydroxyphenyl)methane, bis(4-hydroxy-3-methyl-phenyl)methane, bis(4-hydroxy-3,5-dichlorophenyl)methane, bis(4-hydroxy-3,5-dibromophenyl)methane, bis(4-hydroxy-3,5-difluorophenyl)methane, bis(4-hydroxyphenyl)ketone, bis(4-hydroxyphenol)sulfide, bis(4-hydroxyphenyl)sulfone, 4,4-dihydroxydiphenyl ether, 1,1-bis(4-hydroxyphenyl)ethane, 2,2-bis(4-hydroxyphenyl)propane, 2,2-bis(hydroxy-3-methylphenyl)propane, 2,2-bis(4-hydroxy-3-chlorophenyl)propane, 2,2-bis(4-hydroxy-3,5-dichlorophenyl)propane, 2,2-bis(4-hydroxynaphthyl)propane, bis(4-hydroxyphenyl)phenylmethane, bis(4-hydroxyphenyl)diphenylmethane, bis(4-hydroxyphenyl)-4-methylphenylmethane, 1,1-bis(4-hydroxyphenyl)-2,2,2-trichloroethane, bis(4-hydroxyphenyl)-(4-chlorophenyl)methane, 1,1-bis(4-hydroxyphenyl)cyclohexane, bis(4-hydroxyphenyl)cyclohexylmethane, 4,4-dihydroxydiphenyl, 2,2-dihydroxydiphenyl, dihydroxynaphthalene (e.g. 2,6-dihydroxynaphthalene), hydroquinone, resorcinol, 2,6-dihydroxytoluene, 2,6-dihydroxychlorobenzene and 3,6-dihydroxytoluene.

The derivatives of dihydric phenol are specifically dialkyl esters or diphenyl esters of the foregoing dihydric phenols. These derivatives may be used alone or in combination.

The aromatic dibasic acids are those represented by the formula,

HOOC — Ar′ — COOH wherein Ar′ is an arylene group (e.g. o-phenylene, m-phenylene, p-phenylene, naphthylene) which may be substituted with a halogen atom or an alkyl group. These aromatic dibasic acids may be used alone or in combination.

The derivatives of aromatic dibasic acid are specifically dichlorides, dialkyl esters or diphenyl esters of the foregoing aromatic dibasic acids. These derivatives may be used alone or in combination.

p-Oxybenzoic acid or functional derivatives thereof are those represented by the formula, $$R-O-Ar''-\overset{O}{\underset{\|}{C}}-O-R'$$

wherein Ar″ is an arylene group (e.g. o-phenylene, m-phenylene, p-phenylene, naphthylene) which may be substituted with a halogen atom or an alkyl group, R is a hydrogen atom or an alkyl group and R′ is an alkyl or aryl group. These compounds may be used alone or in combination.

When the raw film or sheet is rolled between compression rolls kept at a required temperature, it is preferred to use a lubricating liquid which makes the frictional coefficient between the roll and the raw film or sheet less than 0.20 at the contact point between them. In the case of the amorphous aromatic high polymers specified by the present invention, trihydric alcohols, paraffine series oils and naphthene series oils are useful as the lubricating liquid. When the above-mentioned frictional coefficient exceeds 0.20, the lubricating effect is not good, so that a sufficient roll-down ratio can not be obtained.

In the course of rolling, it is necessary to apply a tension to the raw film or sheet coming into the clearance between the rolls to such a degree that the film or sheet can travel stably and without meandering.

The crystallinity referred to herein is obtained as follows: The diffraction pattern obtained by the X-ray wide-angle diffractometry is separated into the pattern by the diffraction at crystals and that by the halo of amorphous regions, and an integral strength is obtained for each pattern. Crystallinity is then calculated from the following equation.

$$\text{Crystallinity (\%)} = \frac{I_c}{I_c + I_a} \times 100$$

In the equation, $I_c$ and $I_a$ are the relative strength of the peaks by the diffraction at crystals and by the halo of amorphous regions, respectively. In this case, the values of atomic scattering, absorption, temperature and scattering angle are previously corrected.

Next, in order to clarify the patentability of the present invention, explanation will be given with reference to the two kinds of polyarylate film. One of them is a film obtained by the usual stretching at different temperatures and the other is a film obtained by rolling of the present invention at the same temperatures. In FIG. 1, a roll-down ratio (stretching ratio) and a break strength in the machinery direction are compared between both films. The term "roll-down ratio" referred to herein is a thickness of film or sheet before rolling divided by that of film or sheet after rolling. And, the term "stretching ratio" referred to herein is a thickness of film or sheet before stretching divided by that of film or sheet after stretching.

The following is apparent from FIG. 1. When the polyarylate resin is stretched by the usual methods, the elongation is poor even in the high temperature region. Consequently, the resin is very difficult to stretch. While, when the resin is rolled according to the present invention, the roll-down ratio (elongation) increases with an increase of rolling temperature. Particularly, within 100° C. below the secondary transition point (the temperature 100° C. lower than the secondary transition point of the resin in FIG. 1 is 100° C.), the polyarylate resin film or sheet can easily be endowed with such a degree of orientation that the improvement of its mechanical property and electrical property is noticeable. The upper limit of rolling temperature is the one at which the polyarylate resin film or sheet adheres to the pressure rolls and at the same time the orientation effect is not noticeable. In other words, the upper limit is the temperature 50° C. higher than the secondary transition point (the upper limit of the resin in FIG. 1 is 250° C.).

The polyarylate resin (APC) in FIG. 1 is derived from 2,2-(4-hydroxyphenyl)propane, isophthalic acid chloride and terephthalic acid chloride and has the following formula,

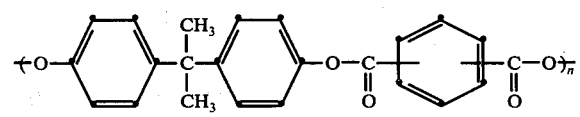

The molar ratio of isophthalic acid chloride to terephthalic acid chloride is 50:50 and the secondary transition point of the resin is 200° C. In FIG. 1, roll-down ratios (stretching ratios) at different temperatures and break strengths in machinery direction of the resulting polyacrylate film are compared, respectively. In FIG. 1, 1 is a roll-down ratio and 1' is a break strength in machinery direction of the rolled film. And, 2 is a stretching ratio and 2' is a break strength in machinery direction of the stretched film. The same tendency as above applies to the amorphous aromatic high polymers other than the polyarylate resin which are included in the scope of the invention.

The present invention will be illustrated specifically with reference to the following examples, but the present invention is not limited to these examples. Table 1 shows the break strength of the film obtained in the examples.

EXAMPLE 1

85% by weight of the polysulfone resin of the formula No. 6 (Polysulfone P-1700 produced by U.C.C.) above and 15% by weight of polyethylene terephthalate (RT-560 produced by Toyo Spinning Co., Ltd.; referred to as "PET" hereinafter) were blended and granulated. The granules were formed into film of 100μ thick by passing through a T-die (400 mm. in width) on a screw type extruder of 30 φ in diameter.

This raw film was rolled on a pair of compression rolls (diameter 260 φ, length 700 mm.) which were kept at 180° C. and were different in take-off speed, and then stretched in the machinery direction. Thus, a continuous film (30μ thick) having a good appearance was obtained. In the course of rolling, glycerin was used as a lubricating liquid and the thickness of the rolled film was 40μ.

Reference Example 1

The raw film in Example 1 was stretched on a group of rolls which were kept at 180° C. and were different in take-off speed. But, the stretched film was broken so often that continuous stretching was difficult.

EXAMPLE 2

The raw film in Example 1 was rolled on a pair of compression rolls (diameter 260 φ, length 700 mm.) kept at 160° C. The rolled film was then stretched in the machinery direction on a group of rolls (diameter 260 φ, length 700 mm.) which were kept at 170° C. and were different in take-off speed, and further stretched in the direction normal to that of rolling (transverse direction) by means of a tenter in an atmosphere of 200° C. Thus, a continuous film (15μ thick) having a good appearance was obtained.

In the course of rolling, glycerin was used as a lubricating liquid and the thickness of the film was 45μ after rolling and 36μ after stretching in the machinery direction.

EXAMPLE 3

A polyimide resin film of 50μ thick and 500 mm. in width (Kapton ®, produced by DuPont) was rolled on a pair of compression rolls (diameter 260 φ, length 700 mm.; having a back-up roll of 520 φ in diameter) kept at 300° C. Thus a continuous film (30μ thick) having a good appearance was obtained. In the course of rolling, silicone oil was used as a lubricating liquid.

EXAMPLE 4

A polyphenylene oxide resin (C-1001 produced by G.E.) was dissolved in chloroform and spread on a moving steel plate (1000 mm. in width) using a solvent casting equipment. Thus a film of 80μ thick was obtained.

This raw film was rolled on a pair of compression rolls (diameter 63 φ, length 1000 mm.; having a back-up roll of 520 φ in diameter) kept at 150° C. The rolled film was then stretched in the direction normal to that of rolling by means of a tenter in an atmosphere of 150° C. Thus, a continuous film (15μ thick) having a good appearance was obtained.

In the course of rolling, Mobil insulating oil No. 2 was used as a lubricating liquid, and the thickness of the rolled film was 35μ.

Reference Example 2

The raw film in Example 4 was stretched, without previous rolling, in the transverse direction by means of a tenter in an atmosphere of 150° C. But the film was broken so often that continuous stretching was difficult.

EXAMPLE 5

80% by weight of a polyethersulfone resin of the formula No. 1 (300P produced by I.C.I.) above and 20% by weight of carbon black were blended and granulated. The granules were formed into a sheet of 300μ thick by passing through a T-die (400 mm. in width) on a screw type extruder of 30μ in diameter. The raw sheet thus obtained was rolled on a pair of compression rolls (diameter 260 φ, length 700 mm.) kept at 210° C. and then stretched on a group of rolls (diameter 260 φ, length 700 mm.) which were kept at 220° C. and were different in take-off speed. Thus, a continuous film (80 μ thick) having a good appearance was obtained.

The rolling was carried out in a dry form and the thickness of the rolled film was 130 μ.

EXAMPLE 6

A polyarylate resin (APC) of the following formula was produced from 2,2-(4-hydroxyphenyl)propane, isophthalic acid chloride and terephthalic acid chloride.

The molar ratio of isophthalic acid chloride to terephthalic acid chloride was 50:50 and the secondary transition point of the resin was 200° C.

This resin was formed into a film of 60 μ thick by passing through a T-die (400 mm. in width) on a screw type extruder of 30 φ in diameter. This raw film was rolled on a pair of compression rolls (diameter 260 φ, length 700 mm.) kept at 200° C. The rolled film was stretched on a group of rolls (diameter 260 φ, length 700 mm.) which were kept at 200° C. and were different in take-off speed, and then further stretched in the direction normal to that of rolling by means of a tenter in an atmosphere of 200° C. Thus a continuous film (9 μ thick) having a good appearance was obtained.

In the course of rolling, silicone oil was used as a lubricating liquid, and the thickness of film was 26 μ after rolling and 21 μ after stretching in the machinery direction.

EXAMPLE 7

A polyamideimide resin film of 50 μ thick and 500 mm. in width (Paiflon ® produced by Hitachi Kasei Co., Ltd.) was rolled on three pairs of compression rolls (diameter 260 φ, length 700 mm.) kept at 250° C. Thus, a continuous film (20 μ thick) having a good appearance was obtained. In the course of rolling, naphthene oil was added as a lubricating liquid to the contact point between the roll and the film.

EXAMPLE 8

A polyhydantoin resin film of 100 μ thick and 500 mm. in width (Resistfol ® produced by Bayer) was rolled on a pair of compression rolls (diameter 260 φ, length 700 mm.) kept at 160° C. and then stretched on a group of rolls (diameter 260 φ, length 700 mm.) which were kept at 180° C. and were different in take-off speed. Thus a continuous film (25 μ thick) having a good appearance was obtained. In the course of rolling, paraffine oil was used as a lubricating liquid.

EXAMPLE 9

A polyoxadiazole resin film of 50 μ thick and 300 mm. in width (SS Film ® produced by Furukawa Denko Co., Ltd.) was rolled on a pair of compression rolls (diameter 260 φ, length 700 mm.) kept at 230° C. Thus, a continuous film (22 μ thick) having a good appearance was obtained. In the course of rolling, glycerin was used as a lubricating liquid.

Table 1

| | | Break strength of film (machinery direction/transverse direction) | | | |
|---|---|---|---|---|---|
| | Film thickness | Elongation ratio at each step (time) | | Break strength | |
| Name of resin | (μ) | Rolling | Stretching in MD | Stretching in TD | (mg/cm²) | Remark |
| Polyulfone (85)/PET (15) blend | 100 | — | — | — | 700/680 | |
| | 40 | 2.5 | — | — | 1600/660 | |
| | 30 | 2.5 | 1.3 | — | 2250/660 | Example 1 |
| Polysulfone (85)/PET (15) blend | 45 | 2.2 | — | — | 1440/670 | |
| | 36 | 2.2 | 1.3 | — | 1910/680 | |
| | 15 | 2.2 | 1.3 | 2.4 | 1880/1600 | Example 2 |
| Polyimide | 50 | — | — | — | 2100/1900 | |
| | 30 | 1.7 | — | — | 3050/1880 | Example 3 |
| Polyphenylene oxide | 80 | — | — | — | 680/690 | |
| | 35 | 2.3 | — | — | 1500/690 | |
| | 15 | 2.3 | — | 2.3 | 1500/1540 | Example 4 |
| Polyethersulfone (80)/ carbon black (20) blend | 300 | — | — | — | 800/750 | |
| | 130 | 2.3 | — | — | 1330/800 | |
| | 80 | 2.3 | 1.6 | — | 1880/790 | Example 5 |
| APC | 60 | — | — | — | 730/700 | |
| | 26 | 2.3 | — | — | 1670/710 | |
| | 21 | 2.3 | 1.2 | — | 2020/700 | |
| | 9 | 2.3 | 1.2 | 2.3 | 1910/1600 | Example 6 |
| Polyamideimide | 50 | — | — | — | 1280/1200 | |
| | 20 | 2.5 | — | — | 2800/1150 | Example 7 |
| Polyhydantoin | 100 | — | — | — | 1060/980 | |
| | 35 | 2.9 | — | — | 2600/1020 | |
| | 25 | 2.9 | 1.4 | — | 3150/970 | Example 8 |
| Polyoxadiaxole | 50 | — | — | — | 1160/1050 | |
| | 22 | 2.3 | — | — | 2420/1060 | Example 9 |

What is claimed is:

1. A method for producing a high-strength film of an amorphous aromatic high polymer which comprises passing a raw film comprising said high polymer, which contains more than 80% of an amorphous resin having aromatic nuclei in the main chains thereof, a crystallinity of less than 30% and a secondary transition point of higher than 150° C., through at least one pair of compression rolls maintained between the temperatures of 100° C. lower than and 50° C. higher than the secondary transition point of said amorphous resin, thereby rolling and orienting said raw film.

2. A method according to claim 1 wherein said high polymer consists of an amorphous resin alone, having aromatic nuclei in the main chains thereof, a crystallinity of less than 30% and a secondary transition point of higher than 150° C.

3. A method according to claim 2 wherein said high polymer is a polyarylene polyether polysulfone resin.

4. A method according to claim 2 wherein said high polymer is a polyarylate resin.

5. A method according to claim 2 wherein said high polymer is a polyimide resin.

6. A method according to claim 2 wherein said high polymer is a polyamideimide resin.

7. A method according to claim 2 wherein said high polymer is a polyphenylene oxide resin.

8. A method according to claim 2 wherein said high polymer is a polyhydantoin resin.

9. A method according to claim 2 wherein said high polymer is a polyoxadiazole resin.

10. A method according to claim 2 wherein said high polymer is a polyparabanic acid resin.

11. A method according to claim 2 wherein said high polymer is a polyoxazine-dione resin.

12. A method according to claim 1 wherein said raw film consists of said high polymer or a mixture of said high polymer with at least one member selected from the group consisting of a resin and a filler.

13. A method according to claim 1 wherein a lubricating liquid which lowers the frictional coefficient between the compression rolls and the raw film to less than 0.2 is added to the contact point between the compression rolls and the raw film.

14. A method according to claim 13 wherein said lubricating liquid is a trihydric alcohol.

15. A method according to claim 14 wherein said lubricating liquid is a paraffin series oil.

16. A method according to claim 14 wherein said lubricating liquid is a naphthene series oil.

17. A method for producing a high-strength film of an amorphous aromatic high polymer, which comprises passing a raw film comprising said high polymer, which contains more than 80% of an amorphous resin having aromatic nuclei in the main chains thereof, a crystallinity of less than 30% and a secondary transition point of higher than 150° C., through at least one pair of compression rolls maintained between the temperatures of 100° C. lower than and 50° C. higher than the secondary transition point of said amorphous resin, thereby rolling said raw film, and then stretching the rolled film in at least one of the following directions:
(1) the same direction as the rolling direction, and
(2) a direction normal to the rolling direction, said stretching being carried out between the temperatures of 100° C. lower than and 50° C. higher than the secondary transition point of said amorphous resin.

18. A method according to claim 17 wherein said high polymer consists of an amorphous resin alone, having aromatic nuclei in the main chain thereof, a crystallinity of less than 30% and a secondary transition point of higher than 150° C.

19. A method according to claim 18 wherein said high polymer is a polyarylene polyether polysulfone resin.

20. A method according to claim 18 wherein said high polymer is a polyarylate resin.

21. A method according to claim 18 wherein said high polymer is a polyimide resin.

22. A method according to claim 18 wherein said high polymer is a polyamideimide resin.

23. A method according to claim 18 wherein said high polymer is a polyphenylene oxide resin.

24. A method according to claim 18 wherein said high polymer is a polyhydantoin resin.

25. A method according to claim 18 wherein said high polymer is a polyoxadiazole resin.

26. A method according to claim 18 wherein said high polymer is a polyparabanic acid resin.

27. A method according to claim 18 wherein said high polymer is a polyoxazine-dione resin.

28. A method according to claim 17 wherein said raw film consists of said high polymer or a mixture of said high polymer with at least one member selected from the group consisting of a resin and a filler.

* * * * *